United States Patent
Cho et al.

(10) Patent No.: US 9,357,406 B2
(45) Date of Patent: May 31, 2016

(54) MODE CONVERSION METHOD FOR CLIENT COOPERATION IN WIRELESS COMMUNICATION SYSTEM AND DEVICE THEREOF

(75) Inventors: Hee Jeong Cho, Anyang-si (KR); Eun Jong Lee, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 14/114,359

(22) PCT Filed: May 9, 2012

(86) PCT No.: PCT/KR2012/003621
§ 371 (c)(1),
(2), (4) Date: Oct. 28, 2013

(87) PCT Pub. No.: WO2012/157884
PCT Pub. Date: Nov. 22, 2012

(65) Prior Publication Data
US 2014/0050155 A1    Feb. 20, 2014

Related U.S. Application Data

(60) Provisional application No. 61/487,293, filed on May 18, 2011.

(51) Int. Cl.
*H04W 4/00* (2009.01)
*H04W 24/02* (2009.01)
(Continued)

(52) U.S. Cl.
CPC ............... *H04W 24/02* (2013.01); *H04W 4/18* (2013.01); *H04W 72/1215* (2013.01); *H04W 52/0216* (2013.01); *H04W 84/12* (2013.01); *H04W 88/06* (2013.01)

(58) Field of Classification Search
CPC .................. H04W 52/0229; H04W 52/0216; H04W 52/0225; H04W 84/12; H04W 52/0232; H04W 52/0258; H04W 36/0016; H04W 36/30; H04W 48/16; H04W 52/0222; H04W 52/0235; H04W 60/04; H04W 68/00; H04W 76/04; H04W 76/048; H04W 8/26; H04M 1/0214; H04M 1/0245; H04M 1/7253; H04M 2250/02; H04M 1/725; H04M 1/73; H04L 12/12
See application file for complete search history.

(56) References Cited

U.S. PATENT DOCUMENTS

2009/0010190 A1* 1/2009 Gong ............................. 370/311
2009/0296617 A1* 12/2009 Lin et al. ....................... 370/311
(Continued)

FOREIGN PATENT DOCUMENTS

JP    2010148060    7/2010

OTHER PUBLICATIONS

Jinsoo Choi et al., "Proposed Text of Device Collaboration Mode for M2M Application", IEEE C802.16p-11/0048, Mar. 14, 2011.
(Continued)

*Primary Examiner* — Chi H Pham
*Assistant Examiner* — Raul Rivas
(74) *Attorney, Agent, or Firm* — Dentons US LLP

(57) ABSTRACT

Provided are a mode conversion method for client cooperation in a wireless communication system and a device thereof. A first device converts a second system repetitively into an active mode which can receive a signal and a non-active mode which cannot receive the signal based on mode conversion information, and detects at least one second device based on the second system in the active mode. The first device is connected to the base station through the second system and another first system.

13 Claims, 16 Drawing Sheets

(51) Int. Cl.
  *H04W 4/18* (2009.01)
  *H04W 72/12* (2009.01)
  *H04W 84/12* (2009.01)
  *H04W 88/06* (2009.01)
  *H04W 52/02* (2009.01)

(56) References Cited

U.S. PATENT DOCUMENTS

| | | | |
|---|---|---|---|
| 2010/0198952 A1* | 8/2010 | Kneckt et al. | 709/223 |
| 2011/0194530 A1* | 8/2011 | Tinnakorn-srisuphap | H04W 36/04 370/331 |
| 2012/0009926 A1* | 1/2012 | Hevizi | H04W 52/0203 455/436 |
| 2013/0070679 A1* | 3/2013 | Wegmann | H04W 36/0083 370/328 |

OTHER PUBLICATIONS

Kyujin Park et al., "Definition of Device Collaboration Mode for Low Power Consumption", IEEE C802.16p-10/0030, Dec. 30, 2010.

Kerstin Johnson et al., "Client Cooperation in Future Wireless Broadband Networks", IEEE C802.16-10/0005r1, Jan. 1, 2010.

* cited by examiner

FIG. 3

| Frame control | Duration /ID | Address 1 | Address 2 | Address 3 | Sequence control | Address 4 | Sequence control | QoS control | HT control | Frame body | FCS |

MODE CONVERSION METHOD FOR CLIENT COOPERATION IN WIRELESS COMMUNICATION SYSTEM AND DEVICE THEREOF

This application is a 35 USC §371 National Stage entry of International Application No. PCT/KR2012/0033621 filed on May 9, 2012, and claims priority of U.S. Provisional Application No. 61/487,293 filed on May 18, 2011, each of which is hereby incorporated by reference in its entirety.

BACKGROUND OF THE INVENTION

1. Field of the Invention

The present invention relates to wireless communication and more particularly, a method and apparatus for converting a mode for client cooperation in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a client cooperation technique may be introduced in a wireless communication system. The client cooperation technique refers to a technique by which a specific device helps transmission of another device. That is, one device may directly communicate with a base station (BS) or may indirectly communication with the BS by the aid of another device. The client cooperation technique has an effect of lower power consumption, throughput enhancement, etc.

The client cooperation technique can be more effectively used in a multi-radio access technology (RAT) device. The multi-RAT device refers to a device that can operate in a plurality of communication systems. For example, the multi-RAT device can operate both in institute of electrical and electronics engineers (IEEE) 802.16m and IEEE 802.11. To provide an easiness access to the BS anytime anywhere and to maintain effective performance, the multi-RAT device can use a multi-RAT client cooperation technique (i.e., improved tethering) in a heterogeneous network.

A multi-RAT device performing a client cooperation technology may require searching for a different multi-RAT device which can help performing client cooperation. Therefore an efficient device search method is required for a multi-RAT device to perform the client cooperation technology without any support.

SUMMARY OF THE INVENTION

The present invention provides a method and apparatus for converting a method for client cooperation in a wireless communication system. The present invention provides a method for converting, by a candidate device which may function as a cooperative device in the client cooperation, into an active mode and a non-active mode, thereby allowing a source device to search for the candidate device.

In an aspect, a method for converting, by a first device, a mode for client cooperation in a wireless communication system is provided. The method includes converting into an active mode where a signal of a second system can be received and a non-active mode where the signal of the second system cannot be received, repeatedly, based on mode conversion information, and detecting at least one second device based on the second system in the active mode. The first device is connected to a base station through a first system which is different from the second system.

The active mode and the non-active mode may be repeated alternately based on a fixed period.

When the at least one second is not detected in the active mode, the non-active mode may be repeated in a manner that an interval of the non-active mode is increased uniformly.

The maximum interval of the non-active mode may be four times an interval of the active mode.

When the at least one second is not detected in the active mode, the non-active mode, which has a specific interval, may be repeated for a specific duration or by a predetermined number of times.

When the at least one second is not detected in the active mode, the non-active mode may be repeated in a manner that an interval of the non-active mode is decreased uniformly When the at least one second is detected in the active mode, the active mode may be maintained.

The method may further include receiving the mode conversion information from the base station.

The mode conversion information may be received from the base station when the first device moves to a specific region, or at specific intervals.

The detecting the at least one second device may comprise transmitting the signal of the second system into the at least one second device.

The second system may be an institute of electrical and electronics engineers (IEEE) 802.11, and the signal of the second system may be a beacon frame of the IEEE 802.11.

The mode conversion information may include information on an interval of the active mode and an interval of the non-active mode.

In another aspect, an apparatus for client cooperation in a wireless communication system is provided. The apparatus include a radio frequency (RF) unit transmitting or receiving radio signals, and a processor connected to the RF unit, and configured to convert into an active mode where a signal of a second system can be received and a non-active mode where the signal of the second system cannot be received, repeatedly, based on mode conversion information, and detect at least one second device based on the second system in the active mode. The first device is connected to a base station through a first system which is different from the second system.

The counterpart device of client cooperation can efficiently search for a candidate device which can function as a cooperative device.

BRIEF DESCRIPTION OF THE DRAWINGS

FIG. 3 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m and IEEE 802.11 are chiefly described as an example in order to clarify the description, but the technical spirit of the present invention is not limited to IEEE 802.16m and IEEE 802.11.

Figure 1:
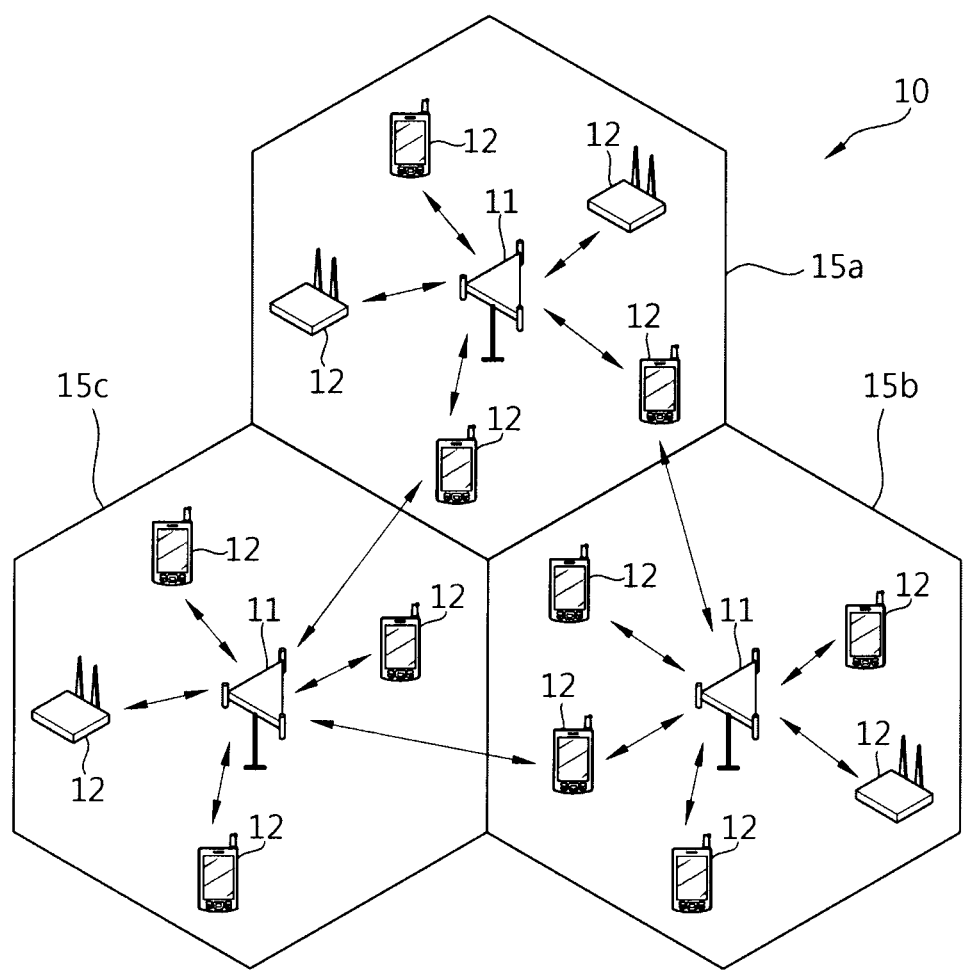
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
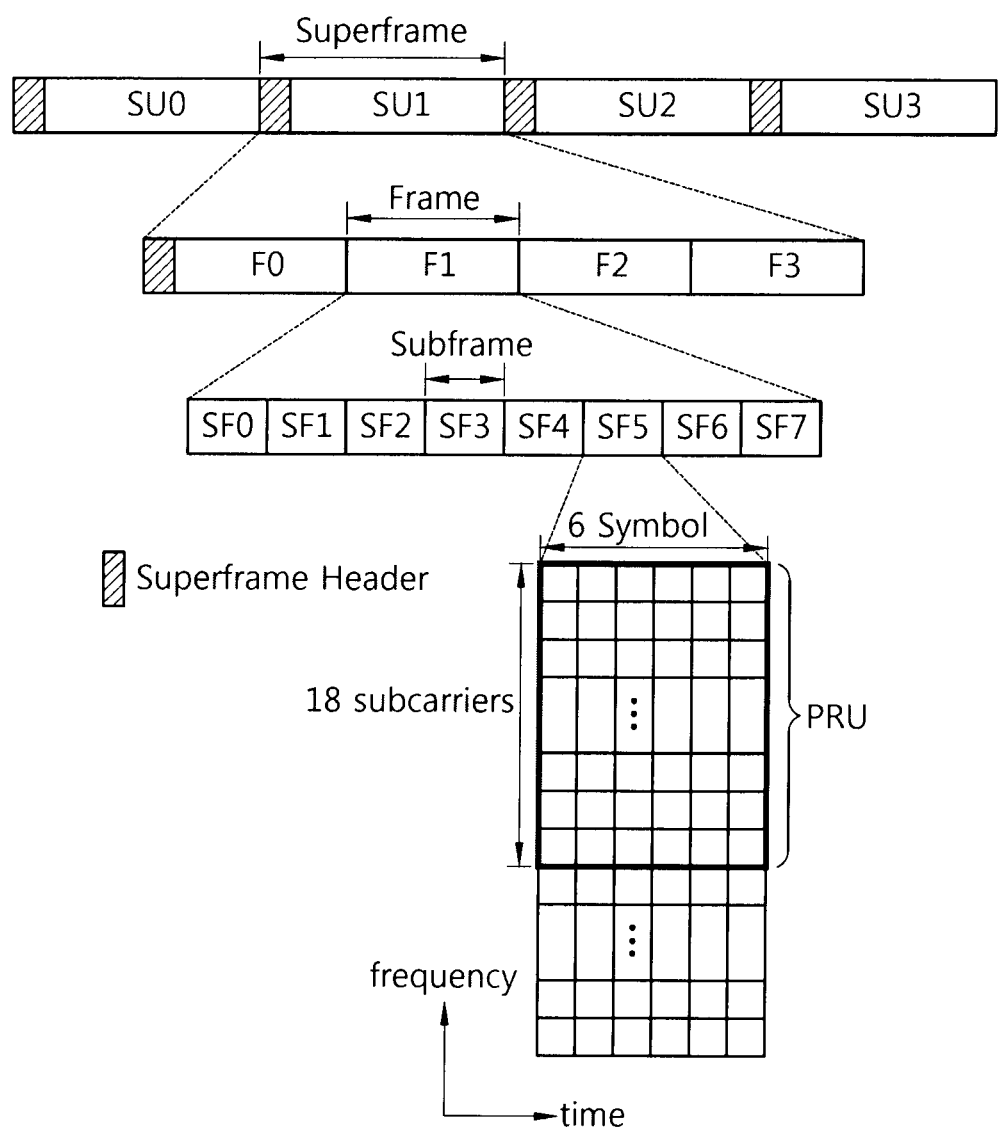
FIG. 2 shows an example of a frame structure of IEEE 802.16m.

FIG. 2 shows an example of a frame structure of IEEE 802.16m.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. A switching point refers to a point where a transmission direction is changed from an uplink region to a downlink region or from a downlink region to an uplink region. In the TDD, the number of the switching points in each frame may be two. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor.

The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | F D D | Number of ODFMA symbols per 5 ms frame | 48 | 34 | 43 | 48 | 48 |
| | | Idle time(μs) | 62.857 | 104 | 46.40 | 62.857 | 62.857 |
| | T D D | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | F D D | Number of ODFMA symbols per 5 ms frame | 51 | 36 | 45 | 51 | 51 |
| | | Idle time(μs) | 45.71 | 104 | 104 | 45.71 | 45.71 |
| | T D D | Number of ODFMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | F D D | Number of ODFMA symbols per 5 ms frame | 43 | 31 | 39 | 43 | 43 |
| | | Idle time(μs) | 85.694 | 40 | 8 | 85.694 | 85.694 |
| | T D D | Number of ODFMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as Δf=$F_s$/NFFT. A useful symbol time is defined as $T_b$=1/Δf. A CP time is defined as $T_g$=G·$T_b$. An OFDMA symbol time is defined as $T_s$=$T_b$+$T_g$. A sampling time is defined as $T_b$/$N_{FFT}$.

FIG. 3 shows an example of a frame structure of IEEE 802.11.

A frame of IEEE 802.11 includes a set of fields in a fixed order. Referring to FIG. 3, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A deauthentication frame is used to finish an authentication relation. An association request frame is transmitted so that the mobile station participates in the network when the mobile station recognizes the compatible network and is authenticated. An association response frame is a response for the association request frame. A deassociation frame is used to finish an association relation.

Three states may exist according to an authentication and association procedure in IEEE 802.11. Table 2 below shows the three states of IEEE 802.11.

TABLE 2

|  | Authentication | Association |
|---|---|---|
| State 1 | X | X |
| State 2 | O | X |
| State 3 | O | O |

To transmit a data frame, a device must perform the authentication and association procedure with respect to a network. In Table 2, a procedure of transitioning from the state 1 to the state 2 can be called the authentication procedure. The authentication procedure can be performed in such a manner that one device acquires information of a different device and authenticates the different device. The information of the different device can be acquired by using two methods, i.e., a passive scanning method for acquiring information of a different node by receiving a beacon frame and an active scanning method for acquiring the information of the different device by transmitting a probe request message and receiving a probe response message received in response thereto. The authentication procedure can be complete by exchanging an authentication request frame and an authentication response frame.

In Table 2, a procedure of transitioning from the state 2 to the state 3 can be called the association procedure. The association procedure can be complete when two devices exchange the association request frame and the association response frame upon completion of the authentication procedure. An association ID can be allocated by the association procedure.

A client cooperation technique may be introduced in a wireless communication system. One device may directly communicate with a base station (BS) or may indirectly communication with the BS by the aid of another device. Hereinafter, a source device refers to a device which communicates with the BS through a connection with another device. A cooperative device refers to a relay entity which helps the source device to communicate with the BS. The client cooperation technique has an effect of lower power consumption. In terms of a device, a path-loss can be decreased by the client cooperation technique, thereby being able to decrease transmit power. In terms of a network, total network power consumption can be decreased. In addition, the client cooperation technique has an effect of throughput enhancement. In terms of a device, a source device can use a good-quality link between a cooperative device and a BS and between BSs. In addition, an antenna extension gain can be obtained. In terms of the network, network capacity can be increased by using client clustering based on frequency reuse without an additional infrastructure.

Figure 4:
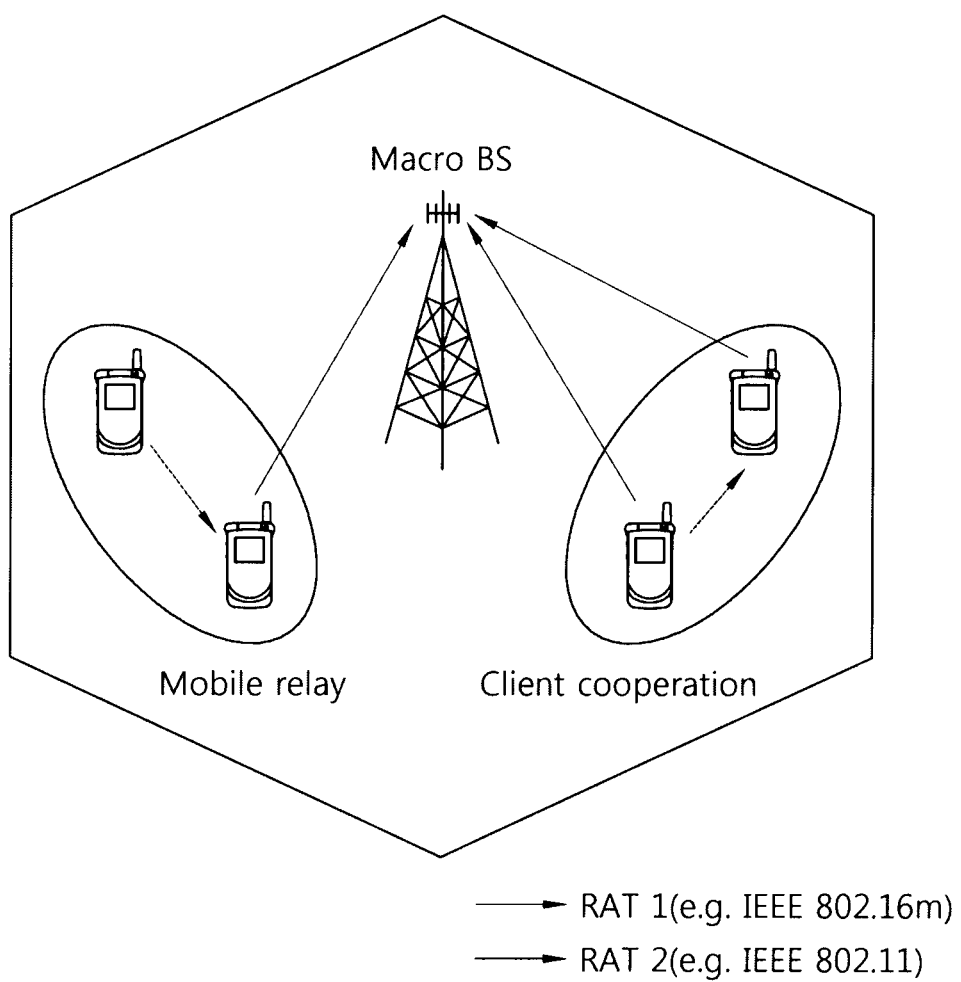
FIG. 4 shows an example of implementing a client cooperation technique.

FIG. 4 shows an example of implementing a client cooperation technique.

Referring to FIG. 4, in the client cooperation technique, a source device can directly communicate with a macro BS, or can communicate with the macro BS via a cooperative device. The cooperative device may directly communicate with the macro BS, or can help communication of the source device. This is different from a mobile relay in a sense that the source device can directly communicate with the macro BS. In this case, each device and the macro BS can communicate by using a first radio access technology (RAT), and the source device and the cooperative device can communicate by using a second RAT. The first RAT may be a radio technology such as IEEE 802.16 (WiMAX), IEEE 802.16m or IEEE 802.20, etc. Alternatively, the first RAT may be a radio technology such as E-UTRA, 3GPP LTE or 3GPP LTE-A, etc. The second RAT may be IEEE 802.11.

Figure 5:
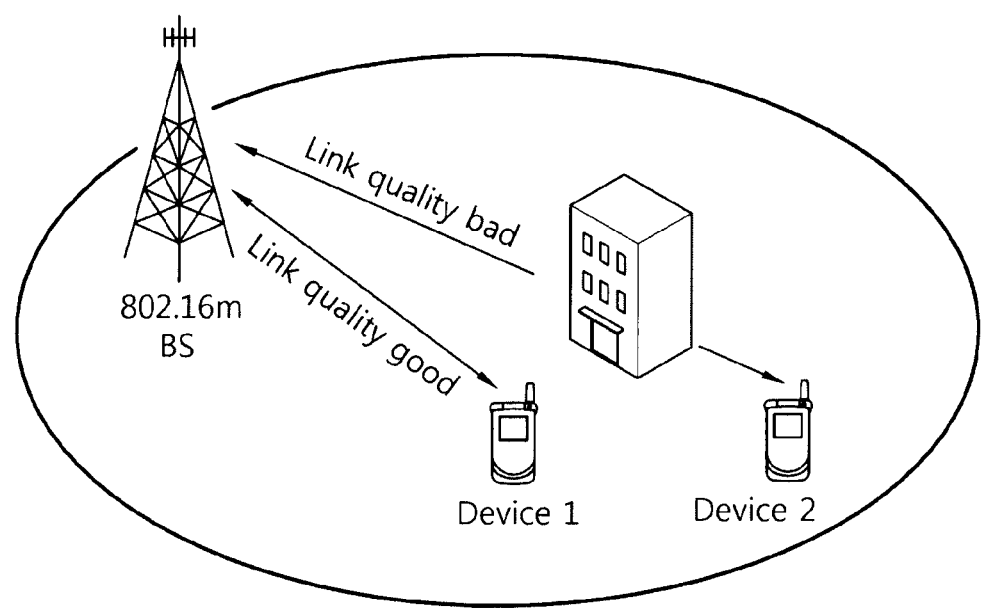
FIG. 5 shows another example of implementing a client cooperation technique.

FIG. 5 shows another example of implementing a client cooperation technique.

The client cooperation technique can be more effectively used in a multi-RAT device. The multi-RAT device refers to a device that can operate in a plurality of communication systems. For example, the multi-RAT device can operate both in IEEE 802.16m and IEEE 802.11. When the multi-RAT device uses the client cooperation technique, the multi-RAT device can communicate with an IEEE 802.16m BS by using a plurality of RATs. For example, as shown in FIG. 5, if channel quality is poor between a second device and a BS or if the second device located in a shadow area cannot receive a signal from the BS, the first device can be used as a cooperative device to communicate with the BS. In this case, each device and the BS can communicate by using the first RAT, and the source device and the cooperative device can communicate by using the second RAT. The first RAT may be a radio technique such as IEEE 802.16, IEEE 802.16m, IEEE 802.20, E-UTRA, 3GPP LTE or 3GPP LTE-A, etc. The second RAT may be IEEE 802.11.

Figure 6:
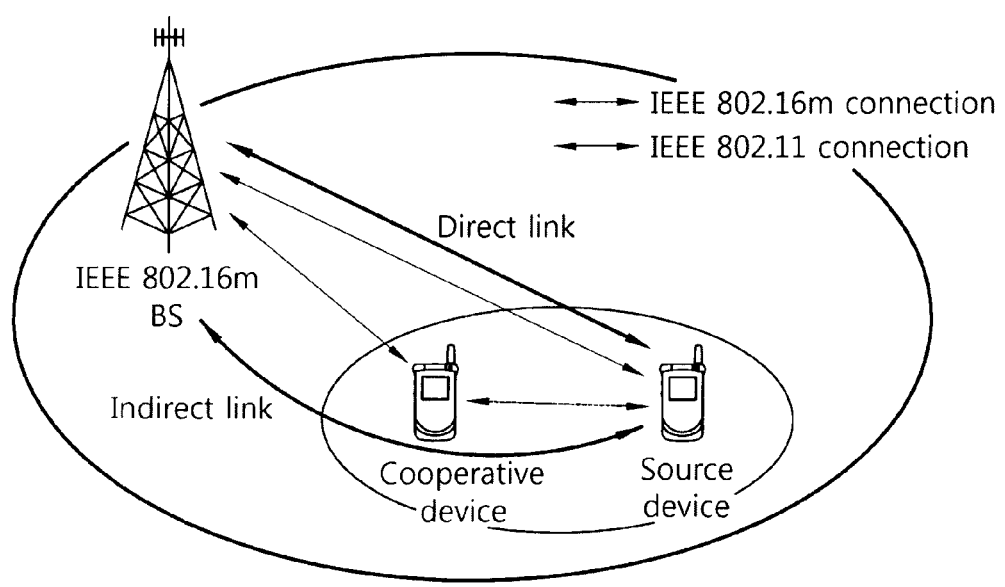
FIG. 6 shows another example of implementing a client cooperation technique.

FIG. 6 shows another example of implementing a client cooperation technique.

A source device and a macro BS (e.g., IEEE 802.16m BS) can be connected through a direct link, and can be connected through an indirect link by using a cooperative device. In this case, each device and the BS can be connected by using IEEE 802.16m, and the source device and the cooperative device can be connected by using IEEE 802.11.

Meanwhile, if a source device is to be connected to a macro base station through client cooperation technology, the source device may need to first search for a device which can function as a cooperative device. While not being connected to the macro base station, however, the source device is unable to obtain support of the macro base station for the device search. In other words, the macro base station may not know if the source device even exists at all. Therefore it is needed that a method for enabling a source device to efficiently search other devices while minimizing power consumption of the respective devices.

In what follows, a subject performing mode conversion is called a candidate device which can function as a cooperative device in client cooperation, while a device searching for the candidate device is called a source device. Also, in what follows, an active mode for the corresponding system refers to a state where the candidate device is able to transmit or receive a signal of the corresponding system. For example, if the candidate device is in the active mode for a second RAT, the candidate device is said to be capable of transmitting or receiving a signal of the second RAT. In other words, a radio frequency (RF) unit of the second RAT within the candidate device is in a power-on state. On the other hand, a non-active mode for the corresponding system refers to a state where the candidate device is unable to transmit or receive a signal of the corresponding system. For example, if the candidate device is in the non-active mode for the second RAT, the candidate device is said to be incapable of transmitting or receiving a signal from the second RAT. In other words, the RF unit of the second RAT within the candidate device is in a power-off state. At this time, the source device is unable to perform the search for a candidate device.

To perform client cooperation, the candidate device may need to perform specific operations for the source device to detect the candidate device. At this time, the candidate device may monitor a second RAT channel. The monitoring of the second RAT channel may be applied when the source device is aware of the information on the candidate device. Similarly, the candidate device may transmit a signal notifying of its existence. The corresponding signal may be a broadcast beacon frame of the IEEE 802.11. The transmitting of the signal may be applied to the case where the source device does not know the information on the candidate device. For example, the transmitting of the signal may be applied to the case where the source device is not connected to a macro base station.

In what follows, a mode conversion method will be described with reference to embodiments. The present invention proposes a method for a candidate device to convert a mode periodically or adaptively so that a source device is enabled to search for the candidate device efficiently.

1) First, a candidate device may perform mode conversion periodically.

Figure 7:
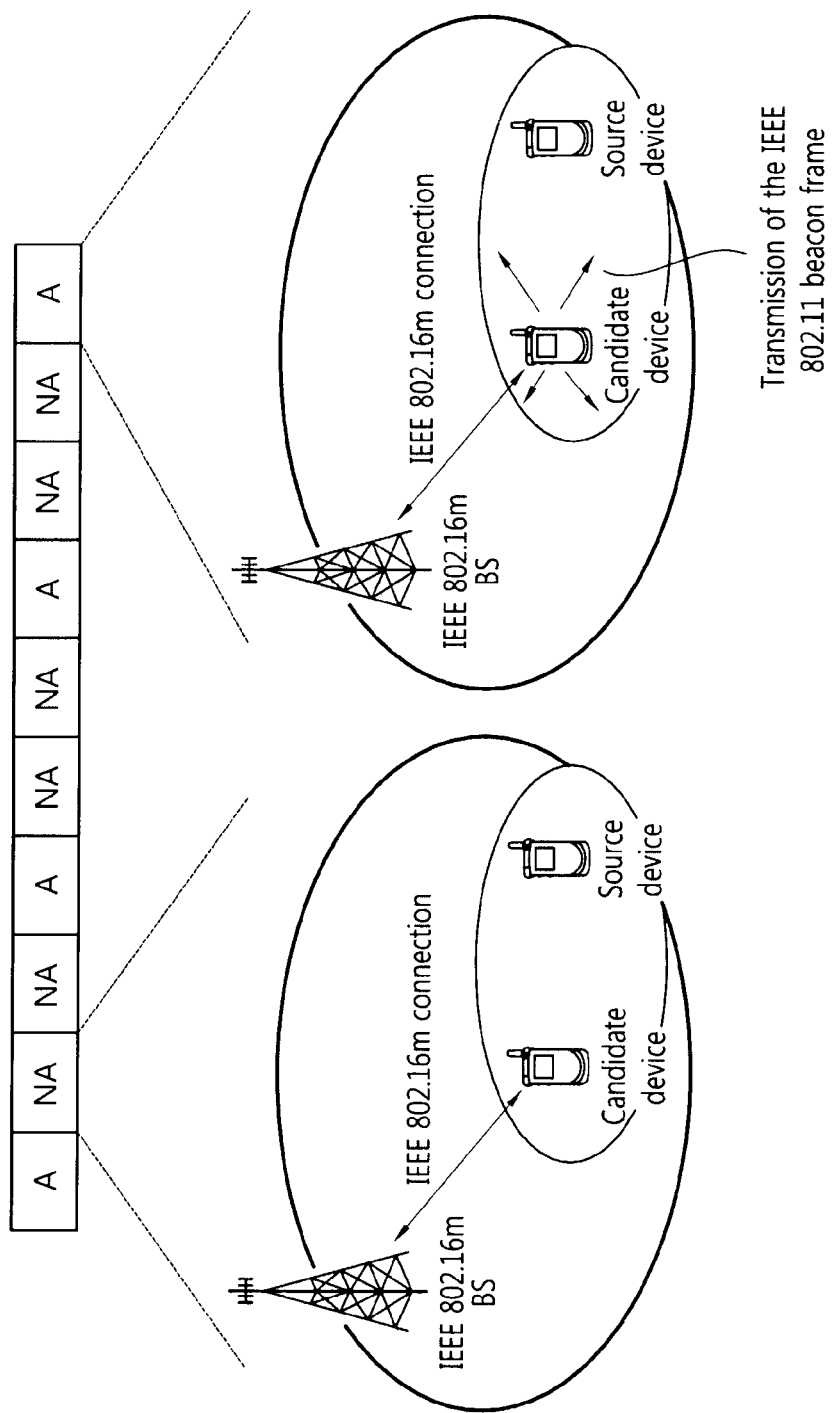
FIG. 7 shows an example where a candidate device converts its mode to an active mode and a non-active mode according to a proposed mode conversion method.

FIG. 7 shows an example where a candidate device converts its mode to an active mode and a non-active mode according to a proposed mode conversion method.

A candidate device may convert its mode into the active mode based on a fixed period. Referring to FIG. 7, the candidate device converts to the active mode based on a fixed period of 3. That is, the candidate device stays in the non-active mode for two intervals and converts to the active mode for the remaining one interval, after which the candidate device repeats conversion to the non-active mode for two intervals. Meanwhile, as shown in FIG. 7, the candidate device transmits a beacon frame of the IEEE 802.11 in the active mode. The source device receiving the beacon frame may detect the candidate device.

2) On the other hand, the candidate device may perform mode conversion adaptively. The candidate device may convert to the active mode at a specific time point according to specific criteria.

Figure 8:
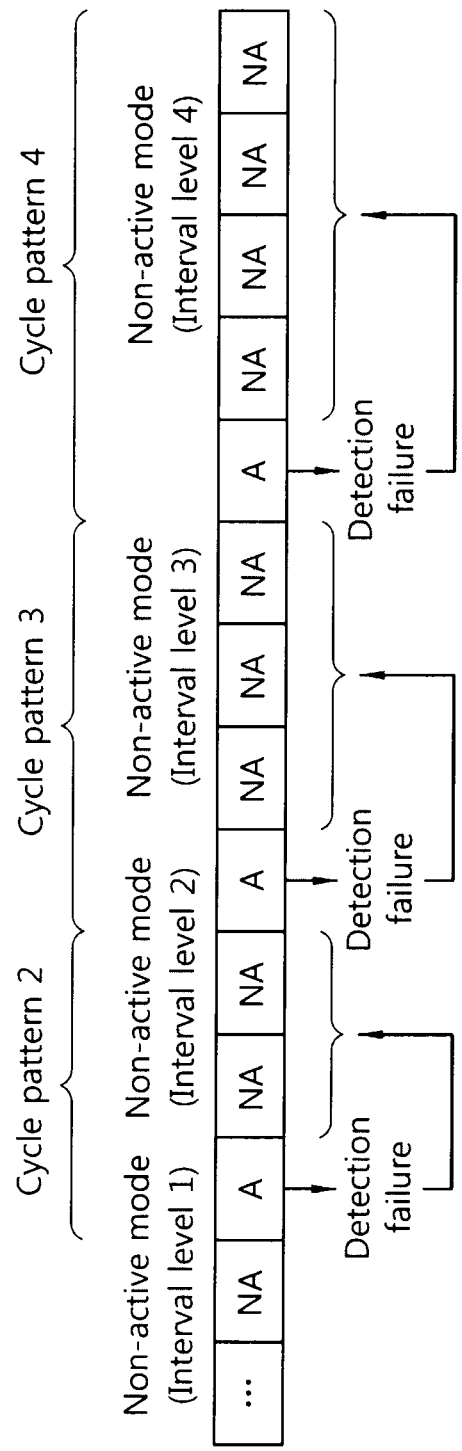
FIG. 8 shows another example where a candidate device converts to an active mode and a non-active mode according to a proposed mode conversion method.

FIG. 8 shows another example where a candidate device converts to an active mode and a non-active mode according to a proposed mode conversion method.

In case other source devices are not detected in the active mode, in other words, a probe request frame or authentication/association request frame is not received from other source devices, the candidate device may increase the interval of the non-active mode uniformly. Referring to FIG. 8, at the initial stage, the interval of the active mode and non-active mode for the candidate device is 1, respectively. Now suppose the interval of non-active mode in this case is denoted as interval level 1. In case other source devices are not detected in the active mode, the interval of non-active mode is increased to 2. The interval of non-active mode for this case may be denoted as interval level 2. Also, the active mode of interval 1 and the non-active mode of level 2 can be grouped to be called cycle pattern 2. If the candidate device again fails to detect other source devices in the active mode, the interval of non-active mode is increased to 3 and 4. At this time, the interval of non-active mode may be denoted as interval level 3 and level 4, respectively. Also, the active mode of interval 1 and the non-active mode of interval level 3 can be grouped to be called cycle pattern 3, while the active mode of interval 1 and the non-active mode of interval level 4 can be grouped to be called cycle pattern 4. The interval of non-active mode may not exceed the interval level 4.

Figure 9:
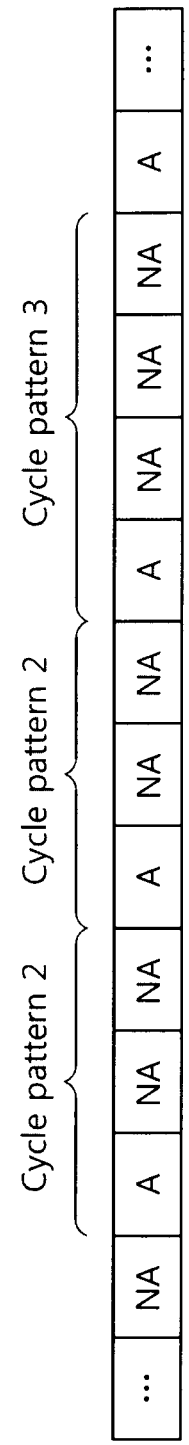
FIG. 9 shows another example where a candidate device converts to an active mode and a non-active mode according to a proposed mode conversion method.

FIG. 9 shows another example where a candidate device converts to an active mode and a non-active mode according to a proposed mode conversion method.

In applying adaptive mode conversion, a specific cycle pattern may be repeated for a specific duration or by a predetermined number of times. Referring to FIG. 9, the cycle pattern 2 of FIG. 8 is repeated twice.

Figure 10:
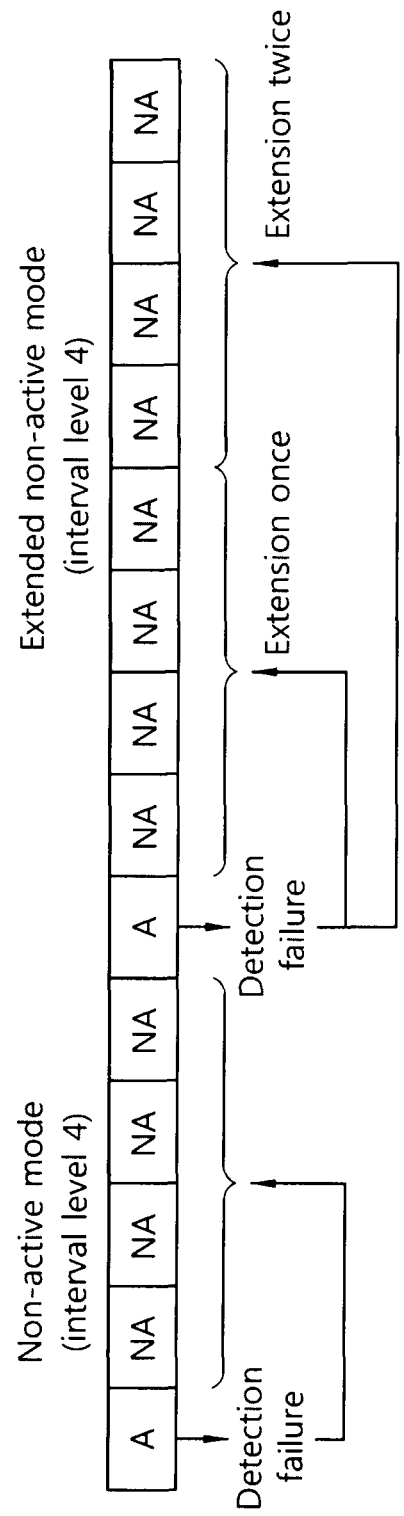
FIG. 10 shows another example where a candidate device converts to an active mode and a non-active mode according to a proposed mode conversion method.

FIG. 10 shows another example where a candidate device converts to an active mode and a non-active mode according to a proposed mode conversion method.

In applying adaptive mode conversion, in case other source devices are not detected in the active mode while the interval level is increased to the maximum level, the non-active mode may be extended by a predetermined amount of time duration or by a predetermined number of times. Referring to FIG. 10, while the non-active mode corresponds to interval level 4, the candidate device in the active mode still fails to detect other source devices. At this time, the non-active mode whose interval level is 4 may be extended by two times of extension of the original interval. In other words, the non-active mode whose interval level is 4 is extended twice, constructing an extended non-active mode.

Figure 11:
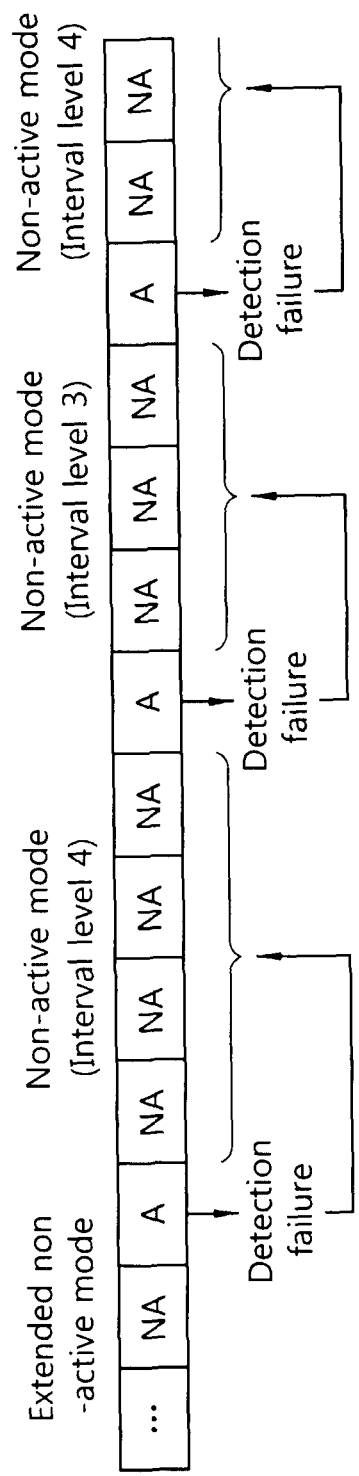
FIG. 11 shows another example where a candidate device converts to an active mode and a non-active mode according to a proposed mode conversion method.

FIG. 11 shows another example where a candidate device converts to an active mode and a non-active mode according to a proposed mode conversion method.

After the extended non-active mode is terminated, the candidate device may decrease the interval of non-active mode uniformly so that other source devices detect the candidate device more quickly. For example, the interval of non-active mode may be reduced in steps down to a specific interval level. The interval of non-active mode is reduced, but as shown in FIG. 8, the interval may be increased again uniformly. Referring to FIG. 11, after the extended non-active mode is terminated, the interval of non-active mode is reduced to interval level 4 and 3. In case the candidate device in the active mode fails to detect other source devices, the interval of non-active mode is again increased to interval level 4.

Figure 12:
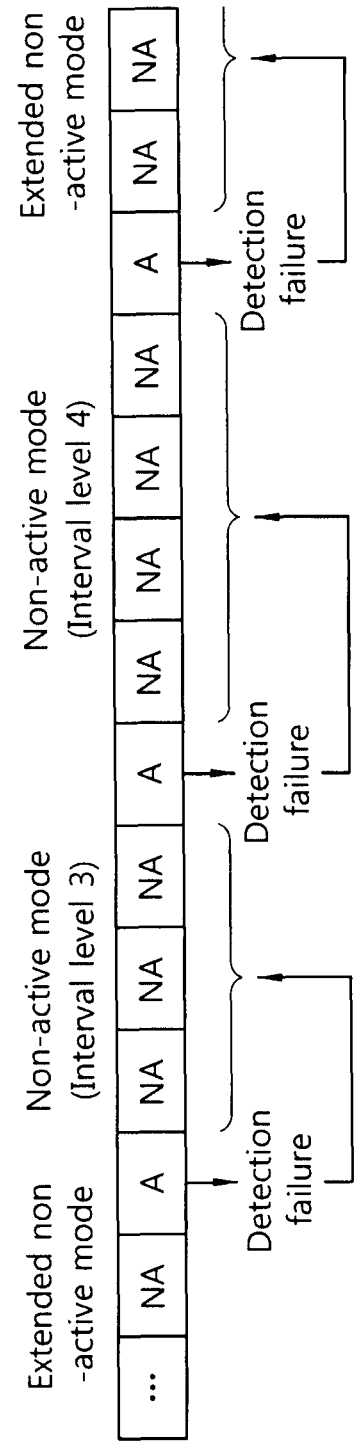
FIG. 12 shows another example where a candidate device converts to an active mode and a non-active mode according to a proposed mode conversion method.

FIG. 12 shows another example where a candidate device converts to an active mode and a non-active mode according to a proposed mode conversion method.

After the extended non-active mode is terminated, the candidate device may increase the interval of non-active mode uniformly so that other source devices detect the candidate device more quickly. For example, the interval of non-active mode may be increased in steps up to a specific interval level. Referring to FIG. 12, after the extended non-active mode is terminated, the interval of non-active mode is increased to interval level 3 and 4.

In the embodiments above, increase or decrease of the interval level is only an example, but the interval of non-active mode can be increased or decreased in various ways.

Figure 13:
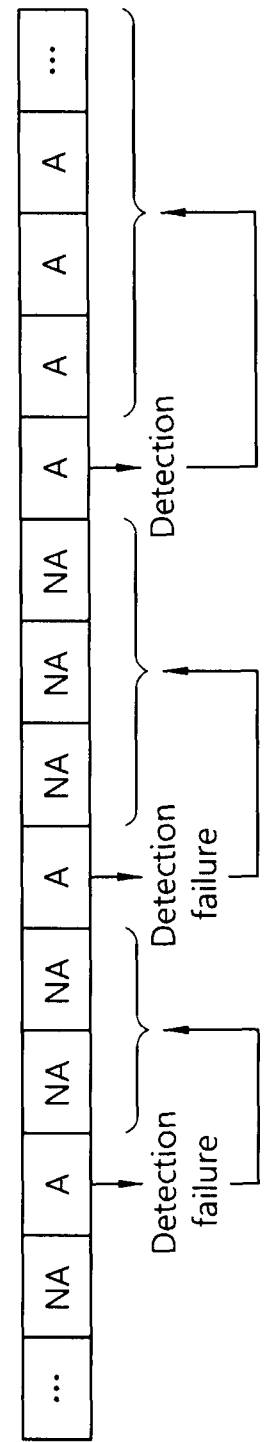
FIG. 13 shows another example where a candidate device converts to an active mode and a non-active mode according to a proposed mode conversion method.

FIG. 13 shows another example where a candidate device converts to an active mode and a non-active mode according to a proposed mode conversion method.

In case the candidate device in the active mode detects other source devices, the candidate device can maintain the active mode until communication with the corresponding source device is completed. Referring to FIG. 13, while being in the active mode, the candidate device detects a source device. The candidate device maintains the active mode until communication with the corresponding source device is completed. The candidate device may convert to the non-active mode based on a fixed period by the order from the base station or by failing to detect another source device for a predetermined time period while communicating with the corresponding source device.

3) On the other hand, the candidate device may employ a procedure of a sleep mode defined in a second RAT. For example, the candidate device is able to monitor a second RAT channel in a listening interval or to transmit a signal notifying of existence of the candidate device so that other source devices detect the candidate device. In case the second RAT corresponds to the IEEE 802.11, the signal notifying of existence of the candidate device may be a beacon frame.

Meanwhile, mode conversion of the candidate device described above may be performed autonomously or according to the order of a macro base station. In case the macro base station commands mode conversion of the candidate device, the macro base station and the candidate device may exchange information for mode conversion of the candidate device. Information for mode conversion of the candidate device may be predetermined by the macro base station, or determined by negotiation between the macro base station and the candidate device.

In case the candidate device converts to the active mode of a fixed period, the information for the mode conversion may include the period of the active mode. In case the candidate device converts to the active mode adaptively, information for the mode conversion may include the following information:

Minimum interval of the active mode: the minimum interval of the active mode may be 5 ms.

Minimum interval of the non-active mode

Increment or decrement value of the interval of the non-active mode;

A total number of unit intervals of the non-active mode for each interval level: for example, interval level 1 may correspond to the non-active mode having an interval of one unit duration;

Maximum interval of the non-active mode

Extension time period or the number of extensions in case the non-active mode is extended.

Operating methods and parameters according to the respective operating method after termination of extended non-active mode Duration or the number of repetition of cycle pattern.

In case the candidate device employs a procedure of a sleep mode defined in the second RAT, information for mode conversion may include parameters related to the sleep mode defined in the second RAT.

Figure 14:
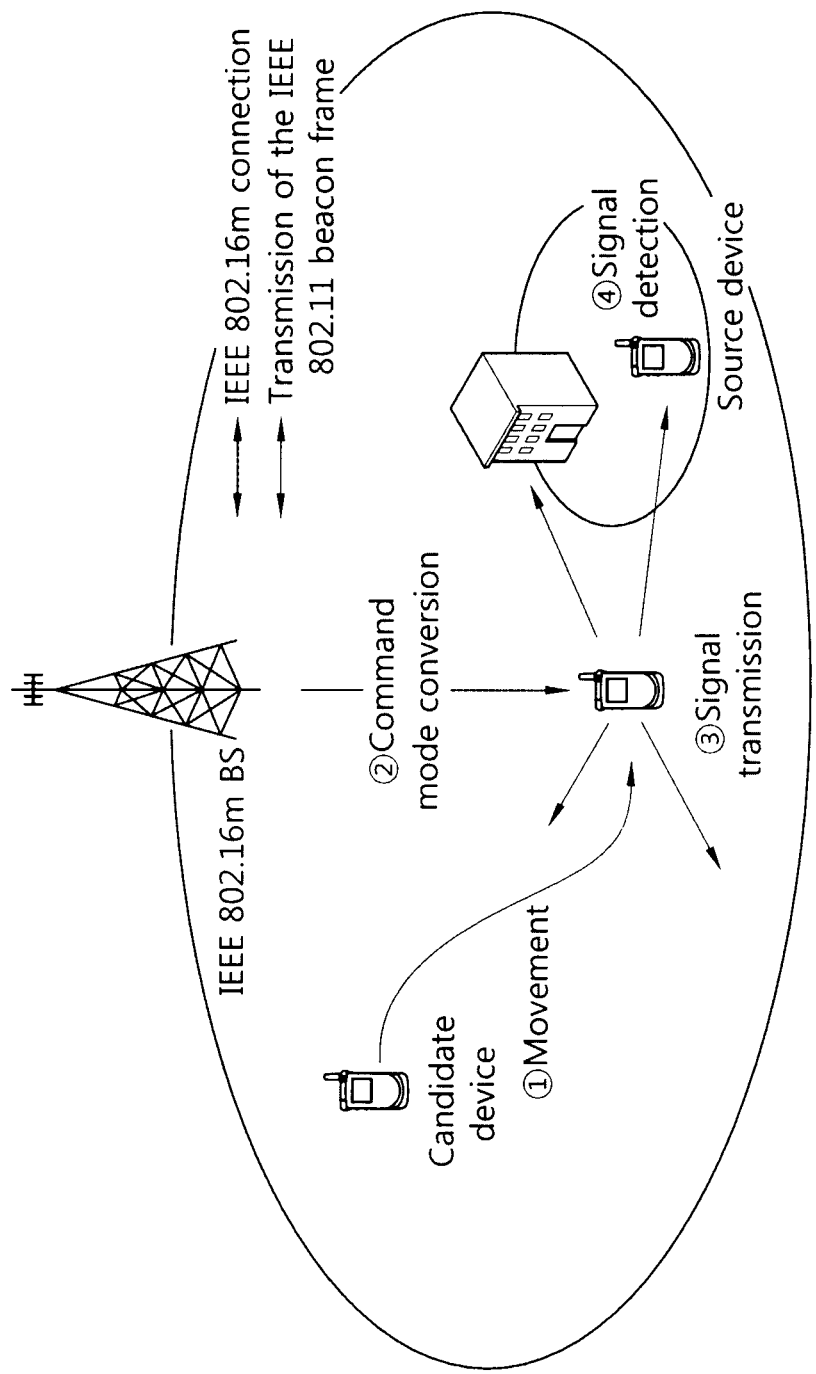
FIG. 14 shows an embodiment of a proposed mode conversion method.

FIG. 14 shows an embodiment of a proposed mode conversion method.

The mode conversion method proposed in FIG. 14 may be applied to a case where the IEEE 802.16m base station commands a candidate device to start a mode conversion procedure for device search. First, the candidate device moves to a specific region. In case the candidate device moves to the specific region, the base station transmits to the candidate device an order commanding carrying out a mode conversion procedure for device search. At this time, the specific region may be a radio-denied region or a region adjacent to a cell boundary. In other words, chances are that a source device performs client cooperation through the candidate device which has moved to the specific region. The candidate device may turn off power of the IEEE 802.11 RF unit to reduce power consumption. The base station has to be aware of the location of the candidate device.

The embodiment of FIG. 14 assumes that a base station transmits an order commanding carrying out a mode conversion procedure for device search in case the candidate device moves to the specific region, but the present invention is not limited to the above assumption. For example, the base station can periodically transmit an order commanding carrying out a mode conversion procedure. In other words, if one or more conditions are satisfied from among various conditions, the base station can command the candidate device to start the mode conversion procedure for device search. At this time, the candidate device receiving the command to start mode conversion procedure may maintain the non-active mode without mode conversion or may be limited to the device which has terminated data communication with other devices.

The candidate device receiving the command from the base station may transmit a beacon frame while in the active mode. Similarly, the candidate device may perform a probe procedure instead of transmitting beacon frames. A source device, detecting the beacon frame transmitted from the candidate device, may figure out existence of the candidate device which will support client cooperation.

Also, the candidate device can perform the mode conversion procedure for device search autonomously without a specific command from the base station. At this time, the candidate device may correspond always to the device operating as a candidate device of client cooperation. A device operating always as a candidate device of client cooperation may correspond to a device developed to be used as a cooperative device of client cooperation or a machine-to-machine (M2M) gateway.

Figure 15:
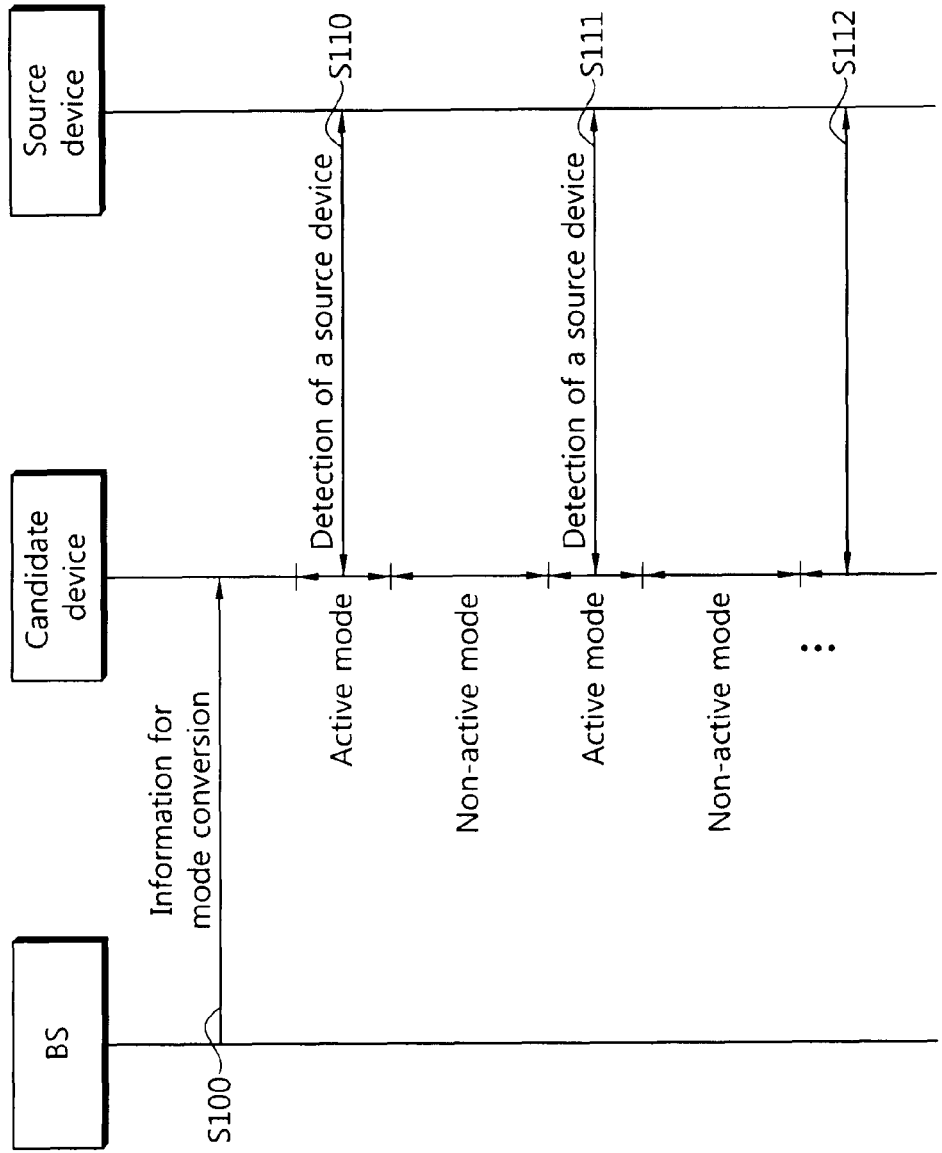
FIG. 15 shows another embodiment of a proposed mode conversion method.

FIG. 15 shows another embodiment of a proposed mode conversion method.

The base station transmits information for mode conversion to the candidate device S100. The information for mode conversion may be transmitted in case the candidate device moves to a specific region or transmitted according to a specific period. The candidate device receiving the information for mode conversion repeats conversion between the active and the non-active mode. The candidate device detects at least one source device while being in the active mode of S110 and S111.

Figure 16:
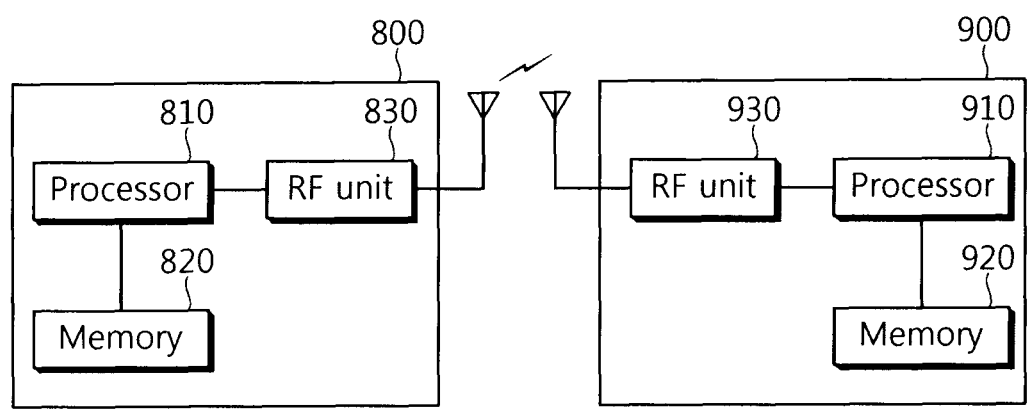
FIG. 16 is a block diagram showing wireless communication system to implement an embodiment of the present invention.

FIG. 16 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for converting a mode for client cooperation in a wireless communication system, the method comprising:
   connecting, by a first device, to a base station through a first Radio Access Technology (RAT);
   converting, by the first device, from a non-active mode to an active mode when a signal of a second RAT is received from at least one second device and from the active mode to the non-active mode when a signal of the second RAT is not received from the at least one second device;
   transmitting, by the first device in the active mode, a detection signal of the second RAT to the at least one second device which is not connected to the base station; and
   establishing, by the first device, a connection between the base station and the at least one second device via the first device when the at least one second device detects the detection signal of the second RAT,
   wherein the first RAT is different from the second RAT.

2. The method of claim 1, wherein the active mode and the non-active mode are repeated alternately based on a fixed period.

3. The method of claim 1, wherein when the at least one second device is not detected in the active mode, the non-active mode is repeated in a manner that an interval of the non-active mode is increased uniformly.

4. The method of claim 3, wherein the maximum interval of the non-active mode is four times an interval of the active mode.

5. The method of claim 1, wherein when the at least one second device is not detected in the active mode, the non-active mode, which has a specific interval, is repeated for a specific duration or by a predetermined number of times.

6. The method of claim 1, wherein when the at least one second device is not detected in the active mode, the non-active mode is repeated in a manner that an interval of the non-active mode is decreased uniformly.

7. The method of claim 1, wherein when the at least one second device is detected in the active mode, the active mode is maintained.

8. The method of claim 1, further comprising:
receiving mode conversion information from the base station when the first device moves to a specific region, or at specific intervals.

9. The method of claim 1, wherein the second RAT corresponds to an institute of electrical and electronics engineers (IEEE) 802.11, and
wherein the detection signal of the second RAT is a beacon frame of the IEEE 802.11.

10. The method of claim 8, wherein the mode conversion information includes information on an interval of the active mode and an interval of the non-active mode.

11. An apparatus for client cooperation in a wireless communication system, the apparatus comprising:
a radio frequency (RF) unit transmitting or receiving radio signals; and
a processor connected to the RF unit, and configured to:
connect to a base station through a first Radio Access Technology (RAT);
convert from a non-active mode to an active mode when a signal of a second RAT is received from at least one second device and from the active mode to the non-active mode when a signal of the second RAT is not received from the at least one second device;
transmit, in the active mode, a detection signal of the second RAT to the at least one second device which is not connected to the base station; and
establish a connection between the base station and the at least one second device via the apparatus when the at least one second device detects the detection signal of the second RAT,
wherein the first RAT is different form the second RAT.

12. The apparatus of claim 11, wherein the active mode and the non-active mode are repeated alternately based on a fixed period.

13. The apparatus of claim 11, wherein the active mode and the non-active mode are repeated adaptively.

* * * * *